US012275256B2

(12) United States Patent
Spurgeon et al.

(10) Patent No.: US 12,275,256 B2
(45) **Date of Patent: *Apr. 15, 2025**

(54) CONTOURED SURFACE PRINTING

(71) Applicant: PS Business Services, LLC, Boulder, CO (US)

(72) Inventors: Stephen Spurgeon, Boulder, CO (US); Robert Ross, Boulder, CO (US)

(73) Assignee: PS BUSINESS SERVICES, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,364

(22) Filed: Jul. 11, 2023

(65) Prior Publication Data

US 2023/0347668 A1 Nov. 2, 2023

Related U.S. Application Data

(63) Continuation of application No. 17/393,072, filed on Aug. 3, 2021, now Pat. No. 11,701,905.

(60) Provisional application No. 63/064,231, filed on Aug. 11, 2020.

(51) Int. Cl.
*B41J 3/407* (2006.01)
*B41J 25/308* (2006.01)

(52) U.S. Cl.
CPC ........... *B41J 25/3088* (2013.01); *B41J 3/407* (2013.01); *B41J 3/4073* (2013.01)

(58) Field of Classification Search
CPC ...... B41J 3/407; B41J 3/4073; B41J 25/3088; B41J 3/40731; B41J 3/40733; B41J 11/0035; B41J 25/304; B41J 25/308; B41J 25/3082; B41J 25/3086; B41F 17/00; B41F 17/006; B41F 17/18; B41F 17/22; B41F 17/24; B41F 17/28; B41F 17/30; B41F 17/32; B41F 17/36; B41P 2217/00; B41P 2217/60; B41P 2217/61; B41P 2217/62
See application file for complete search history.

(56) References Cited

U.S. PATENT DOCUMENTS

| | | | | |
|---|---|---|---|---|
| 4,843,958 | A | 7/1989 | Egosi | |
| 5,237,924 | A | 8/1993 | Fujino et al. | |
| 7,470,455 | B2 | 12/2008 | Spurgeon | |
| 7,736,706 | B1 * | 6/2010 | Spurgeon | B41J 3/40731 427/261 |

(Continued)

FOREIGN PATENT DOCUMENTS

| | | | |
|---|---|---|---|
| FR | 3082780 | A1 | 12/2019 |
| JP | H05293955 | A | 11/1993 |

*Primary Examiner* — Christopher E Mahoney
*Assistant Examiner* — Marissa Ferguson-Samreth
(74) *Attorney, Agent, or Firm* — Holzer Patel Drennan

(57) ABSTRACT

A fixture for supporting an article (e.g., a guitar such as a Stratocaster® guitar body) and controlling the position of the article relative to a print head to allow a contoured portion of a surface of the article to be printed by the print head. The fixture may include a pivot axis about which the article is pivotal. A cam surface may be engaged by the article and/or a bracket of the fixture to which the article is affixed to prescribe the controlled movement of the article based on relative movement between the article and the print head. In turn, both planar and contoured portions of the guitar surface may be printed during a single print operation.

18 Claims, 8 Drawing Sheets

(56) References Cited

U.S. PATENT DOCUMENTS

| | | | | |
|---|---|---|---|---|
| 7,737,349 | B1 * | 6/2010 | Spurgeon | B41M 7/0081 427/469 |
| 7,895,967 | B1 * | 3/2011 | Spurgeon | B41J 11/0021 118/313 |
| 8,192,040 | B2 * | 6/2012 | Spurgeon | A63F 13/28 362/84 |
| 2011/0075395 | A1 * | 3/2011 | Spurgeon | G10D 1/085 362/84 |
| 2019/0337306 | A1 | 11/2019 | Boniface et al. | |
| 2022/0219476 | A1 | 7/2022 | Spurgeon et al. | |
| 2022/0266521 | A1 | 8/2022 | Hasegawa et al. | |

* cited by examiner

CONTOURED SURFACE PRINTING

CROSS-REFERENCE TO RELATED APPLICATIONS

The present application is a continuation application of U.S. application Ser. No. 17/393,072 filed Aug. 3, 2021, entitled "CONTOURED SURFACE PRINTING" which claims benefit of priority to U.S. Provisional Patent Application No. 63/064,231, entitled "CONTOURED SURFACE PRINTING" and filed on Aug. 11, 2020, which is specifically incorporated by reference herein for all that it discloses or teaches.

BACKGROUND

The ability to apply decorations to guitars may offer a number of potential advantages. One advantage is that the decorations may enhance the appeal and level of personalization of the guitar. A musician or collector may select a guitar with a logo, design, or color photograph that suits his or her individual preferences. The decoration may thereby increase interest in the guitar and stimulate purchases and playing of guitars. In addition, decorations applied to a guitar or other article may significantly increase the value of the article.

Various techniques, such as inlays, silkscreen, pre-printed sticker or decal application, and airbrush painting, have been used to apply decorations to guitars. However, there are drawbacks with each of these techniques. Airbrushing tends to be limited by the skill of the airbrush artist and tends to be costly and time-consuming. Stickers and decals are generally difficult to apply and tend to cause defects in the manufacturing process when clear coatings are applied on top of the sticker or decal. Further, continuous contact with the playing surface, as well as continued handling, may tend to alter or remove inks or pigments printed directly on the surface of the guitar, for example by silkscreen.

Other approaches to printing have been proposed such as those described in U.S. Pat. Nos. 7,470,455, 7,736,706, 7,737,349, 7,895,967, and 8,192,040, the entirety of each of which are incorporated by reference herein. However, even these approaches fail to provide suitable printing on articles (e.g., guitars) with contoured surfaces. That is, the use of a large format printer such as an ink-jet printer or the like requires uniform spacing between the print head and the surface to be printed. Contoured surfaces result in variation in such spacing, which degrades image quality and precludes printing on such contoured surfaces.

SUMMARY

The present disclosure relates to a fixture adapted to dispose an article relative to a print head and control the relative position between the article and the print head to allow for printing of a continuous surface of the article at least including a contoured portion of the article. The controlled relative position between the article to be printed (e.g., a guitar or the like) and the print head includes maintaining a uniform surface-to-printer spacing in the contoured portion of the article. The fixture may also control the article to dispose a planar portion of the article in the uniform surface-to-printer spacing. In an example, the fixture may comprise a cam surface against which at least a portion of the fixture or the article bears to define the controlled movement of the article to be printed relative to the print head.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTION

Figure 1:
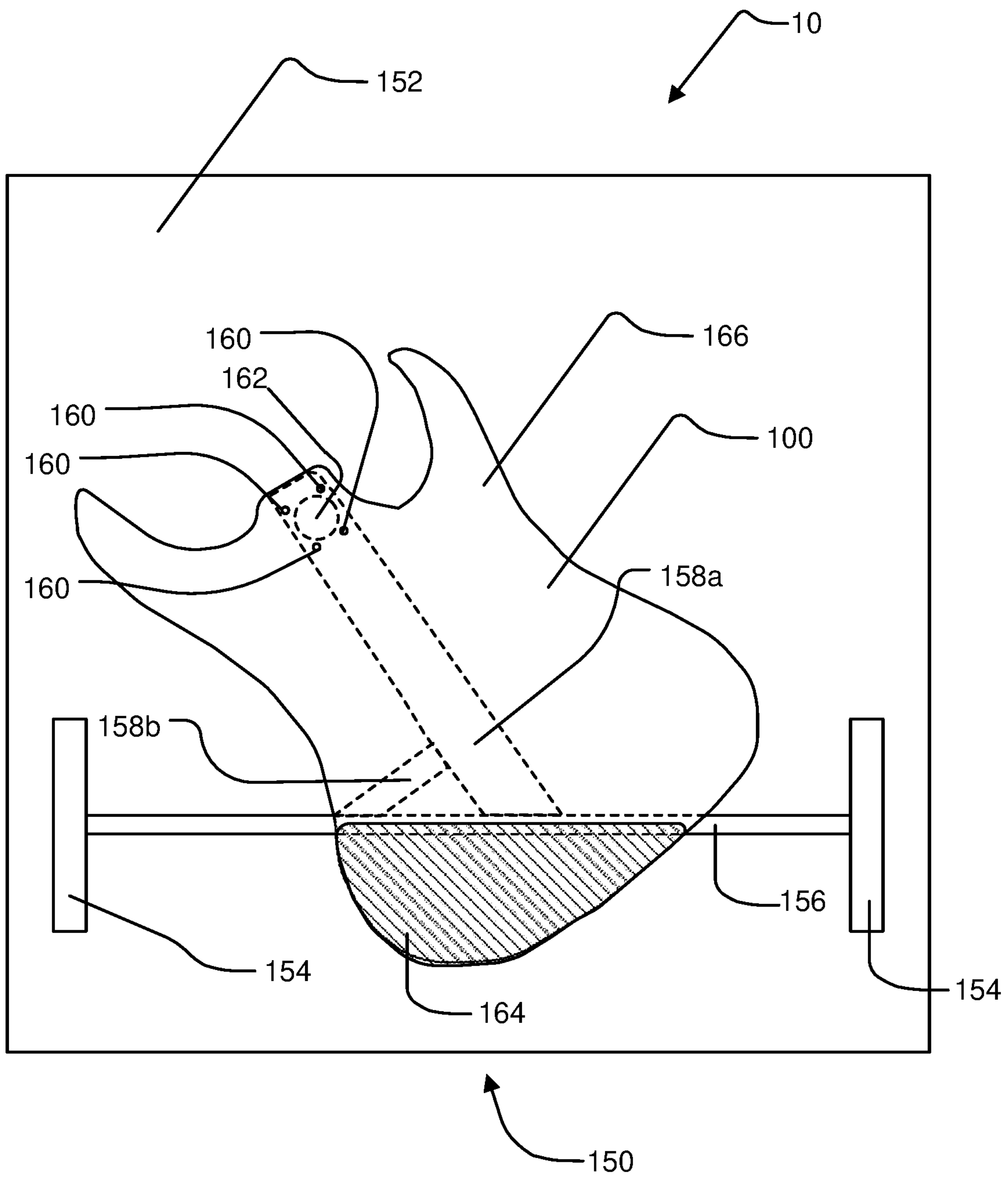
FIG. 1 depicts a top view of an example of a fixture according to the present disclosure having a guitar affixed thereto.

As noted above, proposed techniques for printing decorations onto guitars (e.g., a Stratocaster® guitar produced by Fender Musical Instruments Corp. of Los Angeles, CA), game controllers, or other instruments suffer from the notable limitation of not being capable of printing contoured surfaces in a manner than achieves a satisfactory resulting decoration. As a result, any printed image or design applied to the article (e.g., a guitar) may be limited to the planar or near planar surfaces of the article. Attempts to print on to a contoured portion of the article may result in deterioration in the image quality, and thus provide an unsatisfactory image. This hampers the ability to apply a desired design to the surface of an article to be printed. While the article to be printed is described herein in the various examples as a guitar, it should be appreciated that the present disclosure may be equally applicable to any appropriate article including, for example, guitar-shaped game controllers, other musical instruments, or any other article comprising a contoured portion of a surface on which printing is desired.

When applying printed decorations or designs to a surface of a guitar (e.g. a Stratocaster®) using a printer, very high-resolution imagery may be printed on a flat surface. This is, in part, due to the fact that the distance from the print head to a planar surface to be printed may be maintained within very close tolerances regarding the spacing between the surface to be printed and the print head. In turn, the dispersion of ink droplets in a given printing operation may be uniform and precisely controlled. In turn, very high resolution images or other printed material may be achieved on the planar surface. Examples of printing technology to which this is applicable include ink-jet printing, although other methods of printing may also be utilized without limitation.

Accordingly, ink-jet printing technology is typically applied to flat surfaces. Particularly in the context of large format printers capable of printing on substrates the size of guitars, the ink-jet print head is typically only controllable in two dimensions corresponding to the width and length of an object to be printed. For example, the print head may be moveable on a gantry or the like in two dimensions over a substrate. Alternatively, a substrate may be moved in two dimensions relative to a stationary print head. In any regard, there is no ability to dynamically control the spacing between the print head and the article to be printed. For instance, while the distance between the guitar and the print head may be adjusted, such adjustment may not occur in real time along with the printing operation such that any contour in the article to be printed passing relative to the print head results in a change in the spacing between the print head and the surface to be printed. Accordingly, prior approaches to printing are only applicable for a static distance between a flat surface to be printed and the print head to achieve satisfactory print quality. Any deviations from the static distance may result in aberrations in the ink drop distribution or dispersion that causes defects in a printed image on the surface that is at a different distance to the print head than what the printer is calibrated or designed to operate.

In view of this limitation, printing on guitars in the region of contoured surfaces of the guitar has typically been avoided such that any printed image only appeared on the planar portions of the guitar. For example, many guitar bodies include a contoured surface in which at least a portion of a surface of the guitar body is not planar, which causes difficulty when printing in such areas. One such example of a guitar having such a contoured surface is the Stratocaster® model guitar offered by Fender Musical Instruments Corp. of Los Angeles, CA. Traditional approaches have been unsuited to achieve an image of sufficient quality in such contoured portions of an instrument. In turn, the variety of images and overall ability to achieve a desired image on the guitar has been limited.

In turn, the present disclosure relates to a fixture that is configured to dispose an article to be printed with a contoured surface in relation to a print head in a controlled manner such that the spacing between the surface to be printed and the print head is maintained as the print head moves relative to the article. The fixture presented herein provides a number of benefits. Most notably, use of the fixture described herein allows the entirety of a surface, including a contoured portion of the surface of an article, to be printed with an image or design. Unlike prior approaches, an image or design applied to the article may therefore extend to the entirety of the surface including the contoured portions thereof. This may allow more versatility in printing the images or designs and may result in a more desirable finished product in which the image or design extends to all portions of the surface. In turn, the value of the resulting guitar may be increased as the guitar may be more valuable to a collector, musician, or other user.

Furthermore, the fixture described herein is versatile in that it may be used in any number of different printer arrangements or configurations. Specifically, the fixture provides a relatively simple mechanical control of the article to be printed that may be easily adapted to any printer in which the print head and article to be printed undergo relative movement. The fixture may be secured to an existing print bed of a printer (e.g. a large format printer) such that modification of the printer is not necessary. Further still, the fixture may be disposed between and engaged orientation and a disengaged orientation such that traditional use of the print head may be provided (e.g., in instances of printing of a planar surface only).

Moreover, the relatively simple mechanical operation of the fixture described herein may allow for printing to be achieved on the contoured surface in a cost effective manner. As can be appreciated, alternative approaches in which an additional degree of freedom of control is added to a print head require extensive reengineering of the printer to allow for the control of the print head in the additional degree of freedom. Such additional cost may make such modification infeasible. In contrast, the mechanical operation of the fixture described herein is relatively simple and can be deployed in a cost effective manner. Furthermore, the fixture may be easily retrofitted onto existing printers at little cost with little additional complexity. In addition, different contours of surfaces may be printed by using different corresponding cam surfaces, which may be interchangeable in a simple manner. For instance, there are a number of popular guitar body shapes that are mass produced. In turn, specific cam surfaces may be developed for respective ones of the guitar body shapes to allow for such guitar bodies to be reliably and accurately printed using the fixture described herein.

It should also be appreciated that any appropriate image or printed matter may be applied using the printing techniques described herein. For example, an example of the disclosure relates to a method and apparatus to apply color graphics, designs, photography, or other decorations to guitars or other stringed musical instruments. The methods and apparatus may be employed to provide sharp, bright, and very colorful images, patterns, and other decorations on the front and/or back of the guitar, producing a very attractive product.

In one example, the decoration may be formed over the surface of the guitar by printing, spraying, or otherwise applying a radiation-sensitive material over the surface and then polymerizing, cross-linking, solidifying, or otherwise curing the radiation-sensitive material over the surface by exposing the material to appropriate actinic radiation. The decoration may include a solid, cross-linked, polymerized, radiation-cured material having inks dispersed therein. The decoration applied tends not to affect the performance of the guitar during play. In one embodiment of the invention, the decoration may be formed over the surface of the guitar by ultraviolet (UV) printing. In this embodiment of the invention, the decoration may include a cross-linked material cured by actinic UV radiation and having the inks dispersed therein.

In one embodiment of the invention, the apparatus may include a high-speed jet-printing apparatus such as a UV ink-jet printer. A variety of UV ink-jet printers are commercially available from numerous sources. Suitable UV ink-jet printers include, but are not limited to, the Durst Rho 160, available from Durst Dice America, of Rochester, N.Y., the 3M® Printer 2500 UV, available from 3M Commercial Graphics Division, of St. Paul, Minn., the Inca Eagle 44, available from Sericol Imaging, of Kansas City, Kans., the Leggett and Platt Virtu, available from Leggett & Platt Digital Technologies, of Jacksonville Beach, Fla., the Scitex VeeJet, available from Scitex Vision America Inc., of Marietta, Ga., the PressVu UV™ 180/600 EC and PressVu UV™ 180/360 EC, both available from VUTEk, Inc., of Meredith, N.H., and the Zund Uvjet 215, available from ACCI, of Edina, Minn. Another notable printer is the UJF-605C Flatbed UV. Inkjet Printer, available from Mimaki Engineering Co., LTD, of Tokyo, Japan. Further still, the printer may comprise a Roland LEC 330, Roland LEC 2 330, Roland VersaUV S-Series UV-LED Flatbed Printer available from Roland DG UK of Clevedon, UK, a Roland VersaUV LEJ-640FT Large-Format UV Flatbed Printer available from Roland DGA Corporation of Irvine, CA, or a Mimaki® UJF-6042 MkII Tabletop UV-LED Flatbed printer available from Mimaki Engineering Co. Ltd. of Suwanee, GA.

Figure 2:
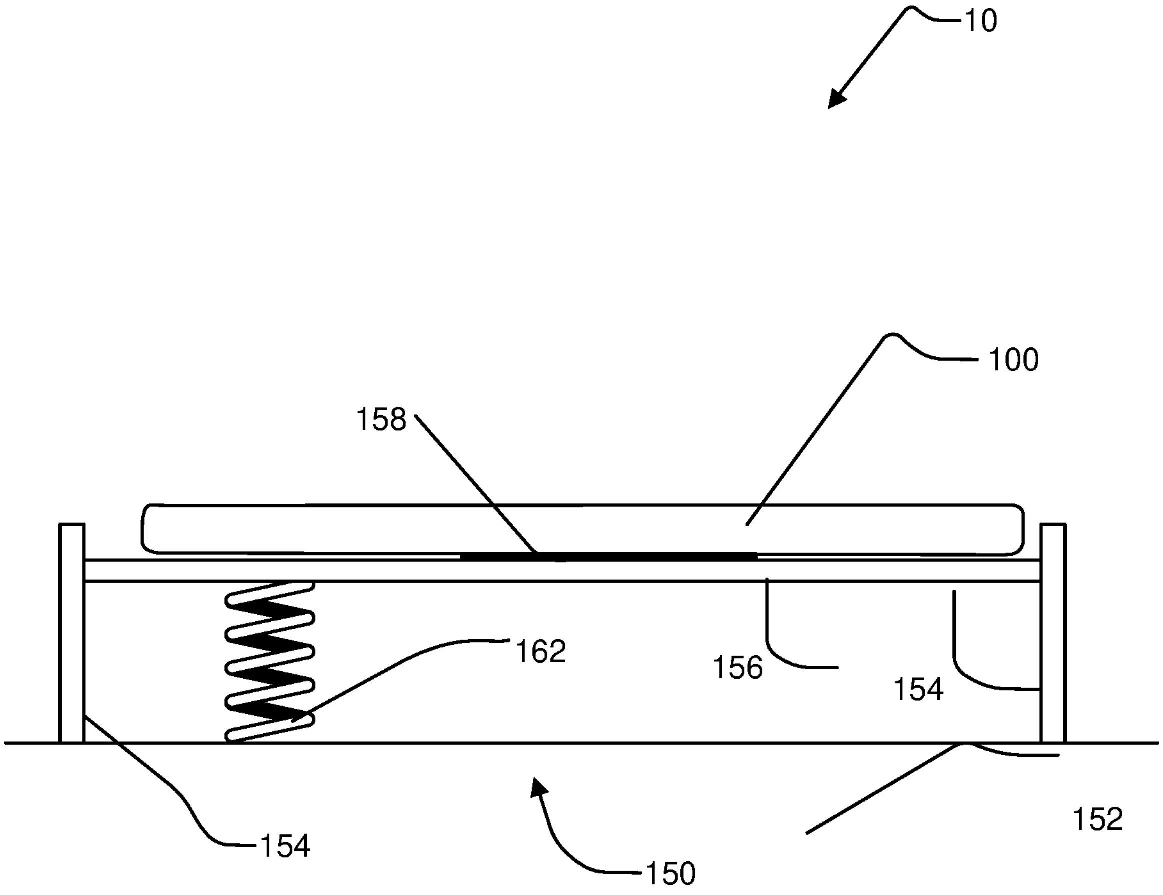
FIG. 2 depicts a rear view of an example of a fixture according to the present disclosure having a guitar affixed thereto.

With reference to FIGS. 1 and 2, an example of a system 10 that utilizes a fixture 150 according to the present disclosure is shown. The fixture 150 may include or be mounted to a reference surface 152. In one example, the reference surface 152 may comprise a printer bed of a large format printer. The fixture 150 may include at least one support 154 that extends from the reference surface 152. In the depicted embodiment, the support 154 includes opposing stanchions that extend from the reference surface 152. The stanchions comprising the support 154 may engage an axle 156 that extends between the stanchions. In this regard, the axle 156 may be supported by the support 154 at a distance offset from the reference surface 152. The distance offset from the reference surface 152 may be at least based in part on the model of guitar to be printed. Furthermore, the model of the printer to be used may also at least in part determine the distance offset.

The axle 156 may define a pivot axis. In addition, the axle 156 may engage a bracket 158. The bracket 158 may be moveable about the pivot axis defined by the axle 156. In the depicted example of the fixture 150, the bracket 158 may comprise a main beam 158*a* and a support beam 158*b*. In this regard, the article 100 may be affixed to the main beam 158*a* and the support beam 158*b* may provide reinforcement to the main beam 158*a*. This may result in a relatively stiff structure that avoids flexure to ensure a consistent distance between the article 100 and a print head as will be described in greater detail below.

The article 100 to be printed may be a guitar body or the like. Specifically, the article 100 may include a contoured portion 164 and a planar portion 166. In FIG. 1, the contoured portion 164 is shown as cross-hatched to highlight the portion of the article 100 comprising the contoured portion 164. As may be appreciated, an interface between the contoured portion 164 and the planar portion 166 may generally be defined at a linear interface. The linear interface between the contoured portion 164 and the planar portion 166 may be arranged parallel to the pivot axis defined by the axle 156. Further still, the body article 100 may be positioned relative to the pivot axis defined by the axle 156 such that a portion of the article 100 overhangs the axle 156 in a direction opposite that of the bracket 158. Accordingly, pivoting of the article 100 about the axle 156 may cause a portion (e.g., the contoured portion 164) to move in a direction opposite from movement of the bracket 158 as described in greater detail below.

The article 100 may be secured to the bracket 158 in any appropriate manner such that the article 100 and the bracket 158 undergo corresponding commiserate movement about the axle 156. In one particular example, the article 100 may be secured to the bracket 158 using fasteners that pass through the article 100 to engage the bracket 158. Specifically, the article 100, which may comprise a guitar, may have neck mounting holes 160 that are provided through the article 100 and used to eventually secure a neck of the guitar to the guitar body. The neck mounting holes 160 may be used to secure the article 100 to the bracket 158. Thus, no additional mounting holes or other mounting hardware need to be added to the article 100 as the existing neck mounting holes 160 may be utilized, thus preventing damage to the article 100.

The fixture 150 also includes a biasing member 162. The biasing member 162 may apply a biasing force to the bracket 158 to urge the bracket 158 into a neutral position relative to the reference surface 152. For example, the neutral position of the bracket 158 may dispose the planar portion 166 of the surface to be printed in a parallel disposition relative to a extent of movement of a print head as will be appreciated in the discussion below. The biasing force applied by the biasing member 162 may be overcome such that the bracket 158 and article 100 may pivot about the axle 156 in a direction toward the reference surface 152.

Figure 3:
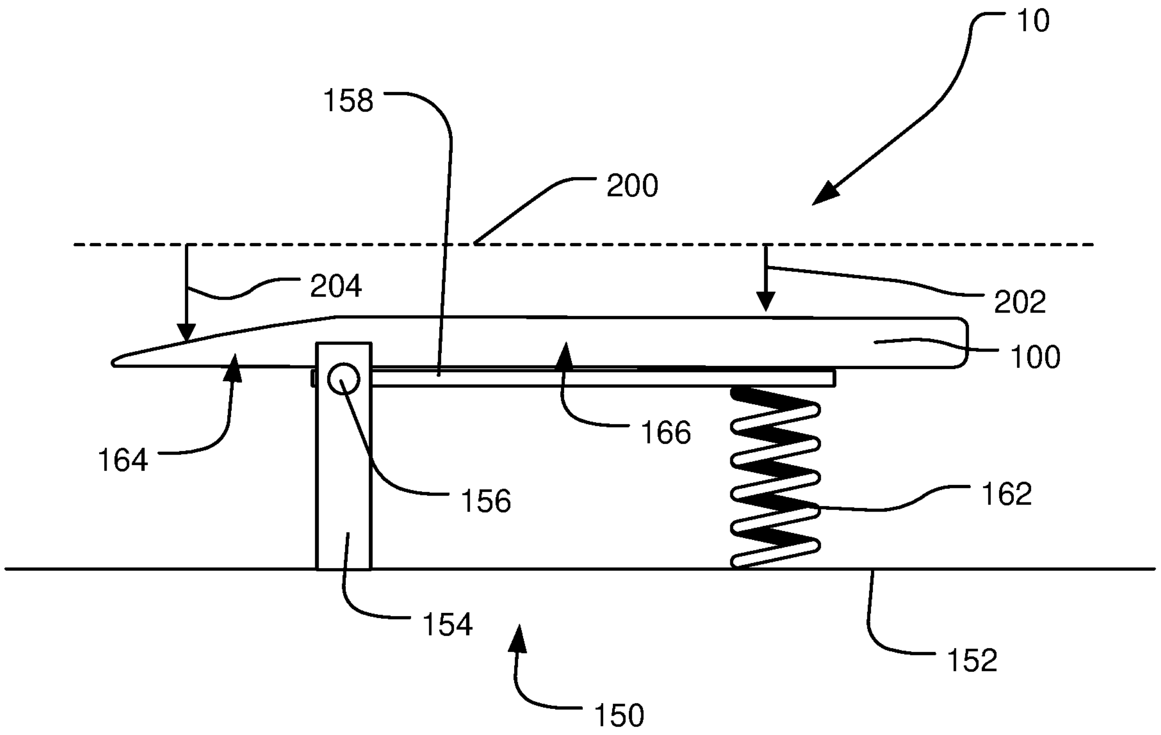
FIG. 3 depicts a side view of an example of a fixture according to the present disclosure showing varying distances to a surface of the guitar from a reference datum.

With further reference to FIG. 3, a datum 200 that is parallel to the reference surface 152 is shown. As can be appreciated, when in the neutral position depicted in FIG. 3, the planar portion 166 of the surface to be printed may be parallel to the datum 200 and be offset from the datum 200 by a first distance 202. However, portions of the contoured portion 164 may be a second distance 204 from the datum 200 which is greater than the first distance 202. In turn, the datum 200 may represent a path of a print head relative to the article 100. This illustrates the problem of printing onto an article with a contoured surface 164 as the second distance 204 of the contoured surface 164 from a print head datum 200 may vary such that print quality is unsatisfactorily degraded in the contoured surface 164.

Figure 4:
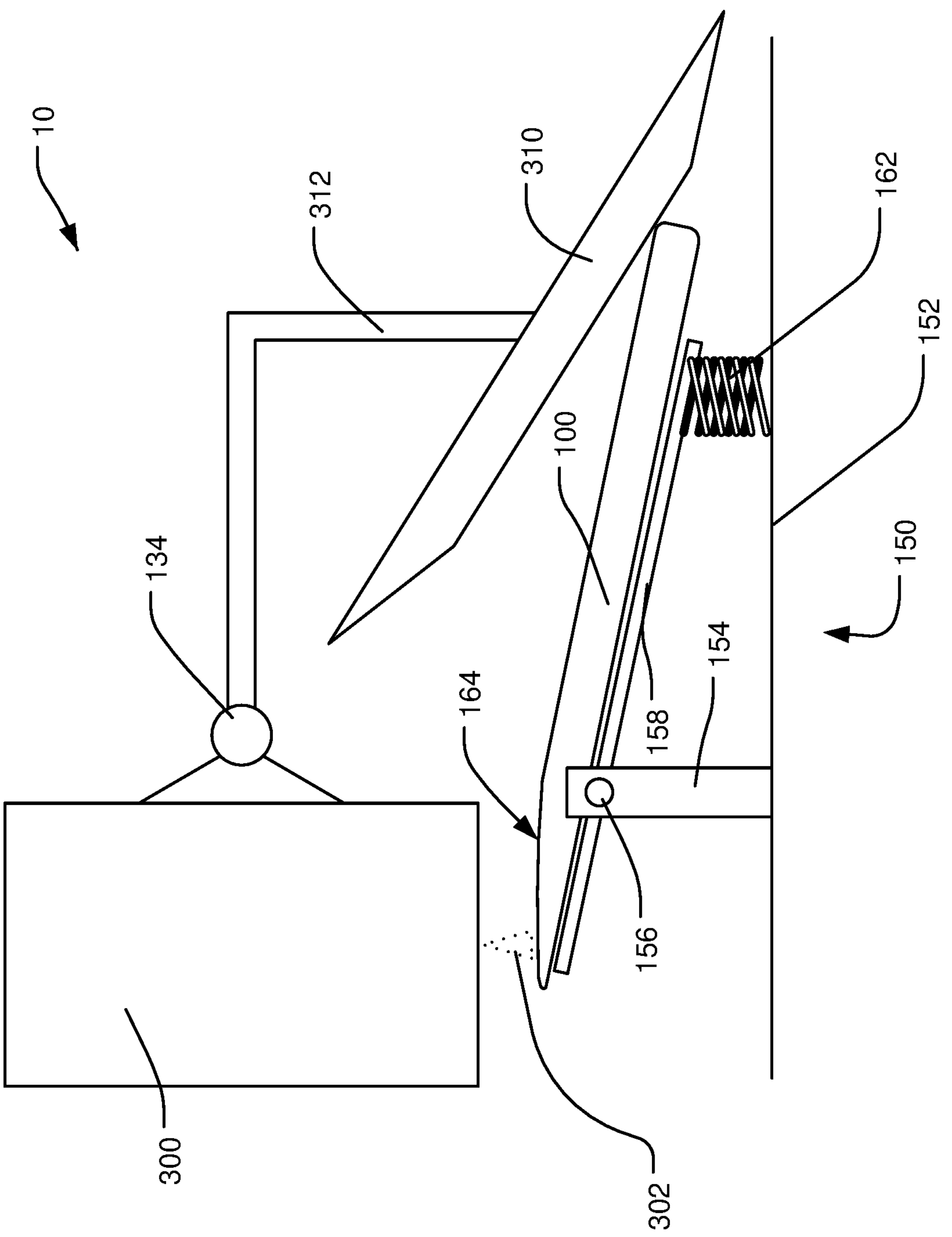
FIG. 4 depicts a side view of an example of a fixture according to the present disclosure positioned relative to a print head and engaged with a cam surface to dispose a guitar affixed to the fixture in a first position for printing on a contoured portion of the guitar.

Accordingly, with further reference to FIG. 4, the fixture 150 may interface with a cam surface 310. FIG. 4 depicts a print head 300 disposed relative to the fixture 150. The print head 300 may have an ink jet 302 that must be at a given offset distance from the surface to be printed to achieve satisfactory image resolution.

The print head 300 may have affixed thereto a mount 134 and a support arm 312. The support arm 312 may be moveably attached to the mount 134 to allow the support arm 312 and cam surface 310 to be moved relative to the print head 300 as described in greater detail below. In any regard, the cam surface 310 may be disposed in a fixed position relative to the print head 300. In turn, when the print head 300 is disposed relative to the contoured portion 164 of the article 100, the article 100 or the bracket 158 may contact the cam surface 310.

Figure 5:
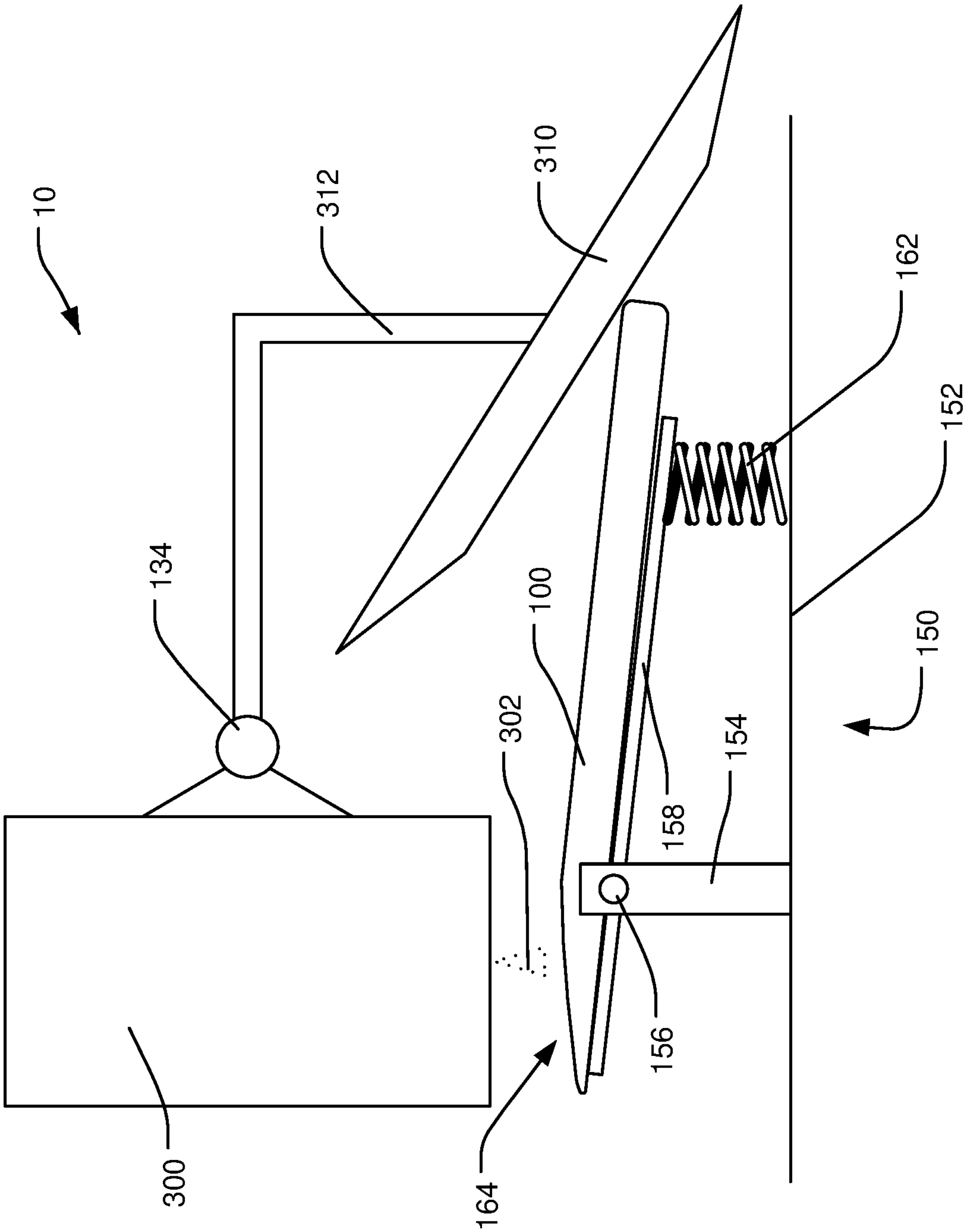
FIG. 5 depicts a side view of an example of a fixture according to the present disclosure positioned relative to a print head and engaged with a cam surface to dispose a guitar affixed to the fixture in another position for printing on a different section of the contoured portion of the guitar.

The contacting engagement of the article 100 with the cam surface 310 may result in the biasing force applied by the biasing member 162 on the bracket 158 to be overcome causing the bracket 158 and article 100 to be pivoted toward the reference surface 152 as shown in FIG. 4. By pivoting the bracket 158 and the article 100 toward the reference surface 152, the contoured surface 164 may be elevated to dispose the contoured surface 164 relative to the print head 300 such that the ink jet 302 extends at an offset distance to allow the ink jet 302 to create an image of a suitable resolution. That is, as described above, pivoting of the bracket 158 in a direction toward the reference surface 152 may cause a portion overhanging the axle 156 to pivot in a direction away from the reference surface 152. The cam surface 310 may be of a profile corresponding to the contoured surface 164 such that as the print head 300 and article 100 undergo relative movement, the cam surface 310 may allow the bracket 158 and article 100 to be pivoted away from the reference surface 152 under influence of the biasing force applied by the biasing member 162 as shown in FIG. 5. The pivotal movement of the bracket 158 and article 100 may thus be controlled by the interaction of the article 100 and cam surface 310 under the influence of the biasing member 162. Relative movement between the print head 300 and the article 100 may result in the cam surface 310 controlling the movement of the article 100 relative to the print head in a programmed manner such that the contoured surface 164 is maintained at the proper offset distance for the ink jet 302 of the print head 300.

Figure 6:
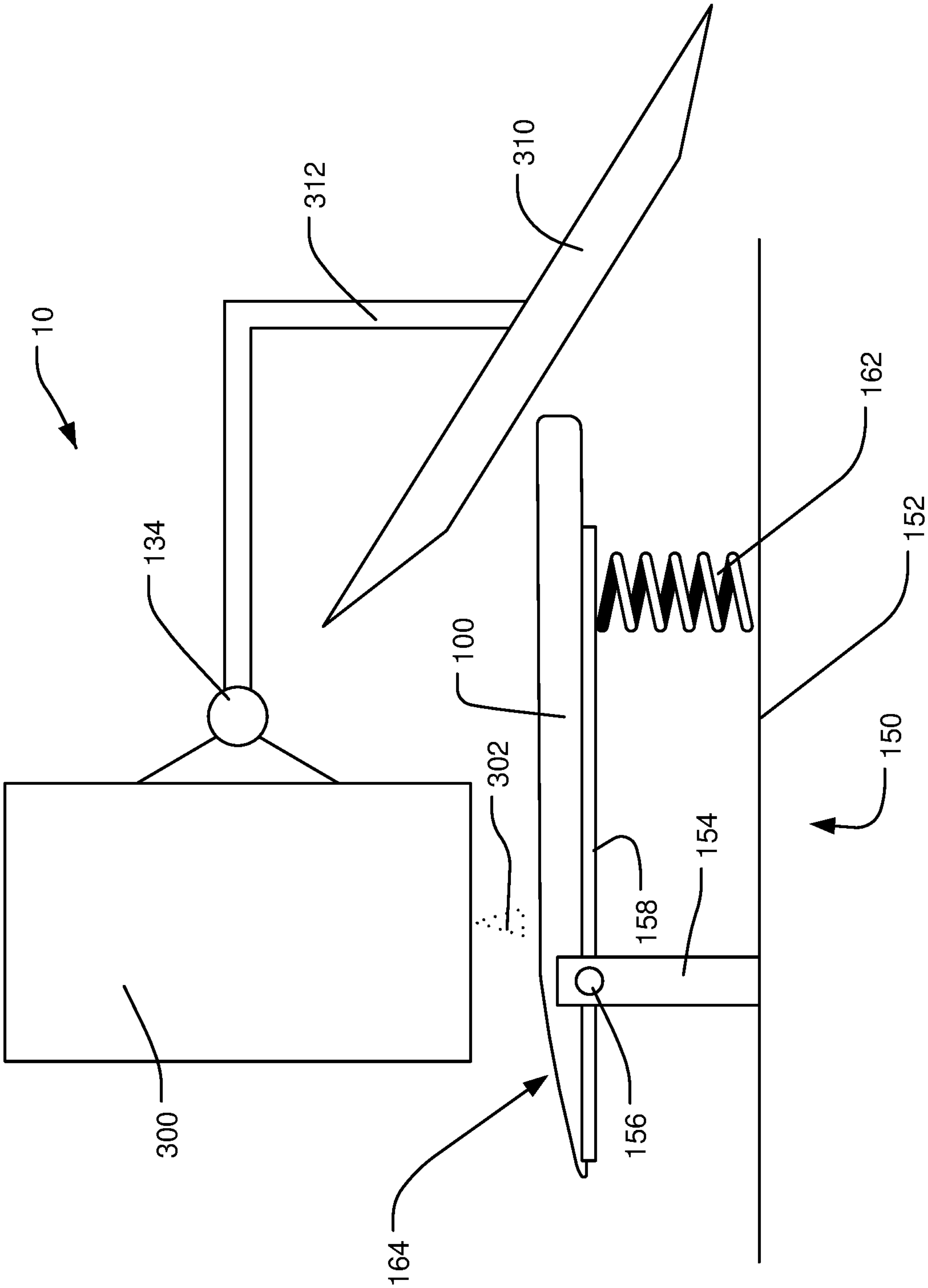
FIG. 6 depicts a side view of an example of a fixture according to the present disclosure positioned relative to a print head and free from engagement with a cam surface to dispose a guitar affixed to the fixture in another position for printing on a different section of the contoured portion of the guitar.

The print head 300 and the article 100 may undergo relative movement until the ink jet 302 reaches the planar portion 166 of the article 100 at which time the cam surface 310 may disengage the article 100 such that the bracket 158 is disposed in the neutral position such that the planar portion 166 is parallel to a path of travel of the print head 300 such that the offset distance is maintained between the planar portion 166 of the article 100 and the print head 300 as shown in FIG. 6. In this regard, relative movement of the print head 300 to which the cam surface 310 is fixed and the article 100 may result in the cam surface 310 defining the movement of the article 100 to position the surface at a fixed offset distance from the print head 300. As the print head 300 traverses over the contoured portion 164, the cam surface 310 contacts the article 100 to dispose the article 100 and the bracket 158 in a position such that the contoured surface 164 is elevated by way of the pivotal movement about the axle 156 to achieve the offset distance for the print head 300. Proper spacing between the surface of the article 100 and the print head 300 may be maintained for any relative movement between the article 100 and the print head 300 (e.g., the print head may make multiple passes over the article 100 such that upon each pass, the article 100 is controllably disposed in a proper offset spacing to the print head 300).

As noted above, the support arm 312 may be moveably attached to the mount 134. For example, the mount 134 may comprise a pivot that allows the support arm 312 and, in turn, the cam surface 310 to move from an engaged orientation shown in FIGS. 4-6 to a disengaged orientation shown in FIG. 7. In the disengaged orientation, the cam surface 310 is disposed away from the article 400 to be printed. Thus, for example, a substantially planar article 400 without a contour in the surface to be printed may also be printed and supported by the fixture 150 without contacting the cam surface 310.

Figure 7:
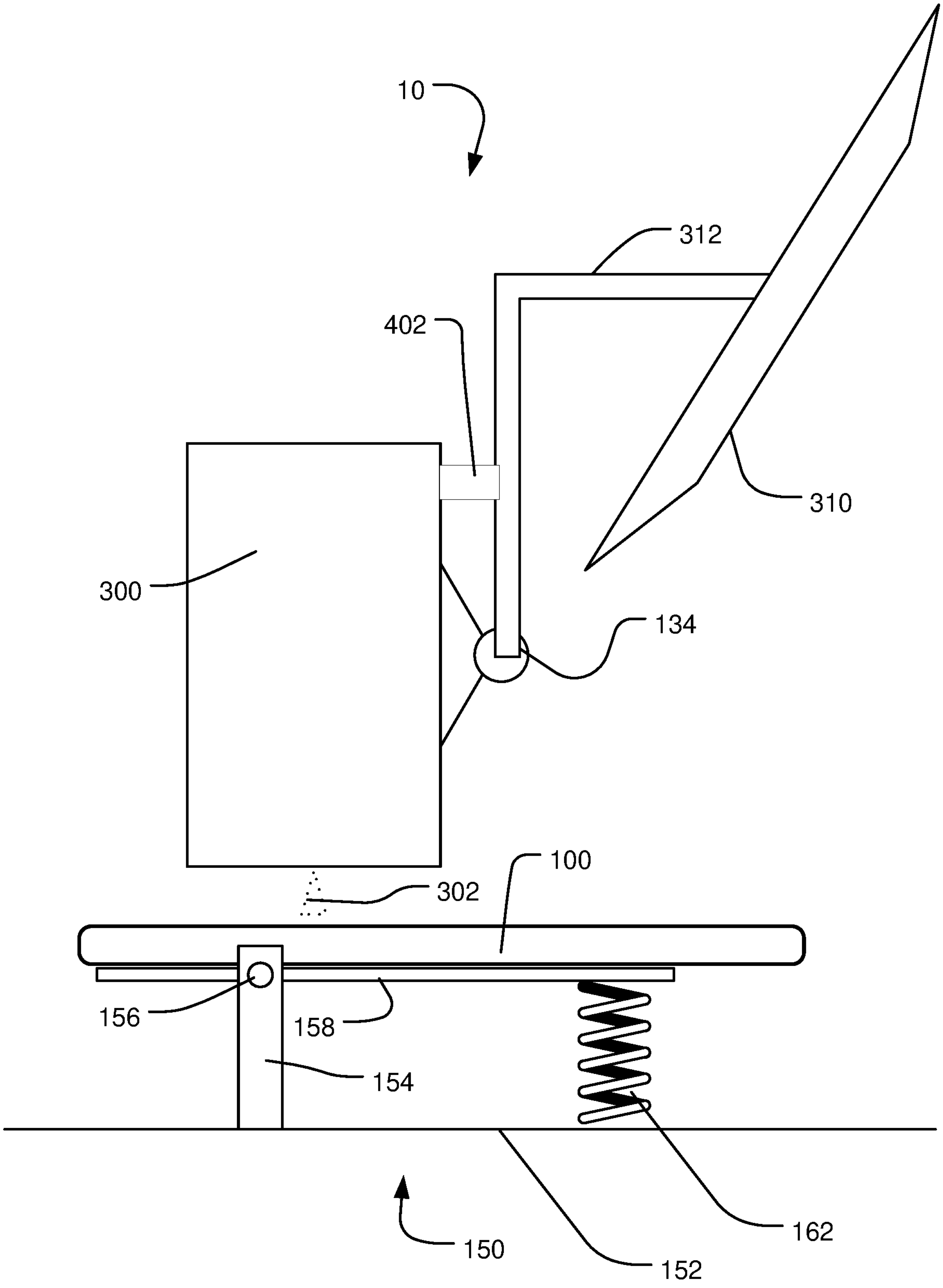
FIG. 7 depicts a side view of an example of a fixture according to the present disclosure positioned relative to a print head in which a cam surface engaged with the print head is disposed in a disengaged orientation.

The support arm 312, print head 300, and/or other component may also include a latch 402 that engages the support arm 312 to maintain the support arm 312 and cam surface 310 in the disengaged orientation shown in FIG. 7.

Figure 8:
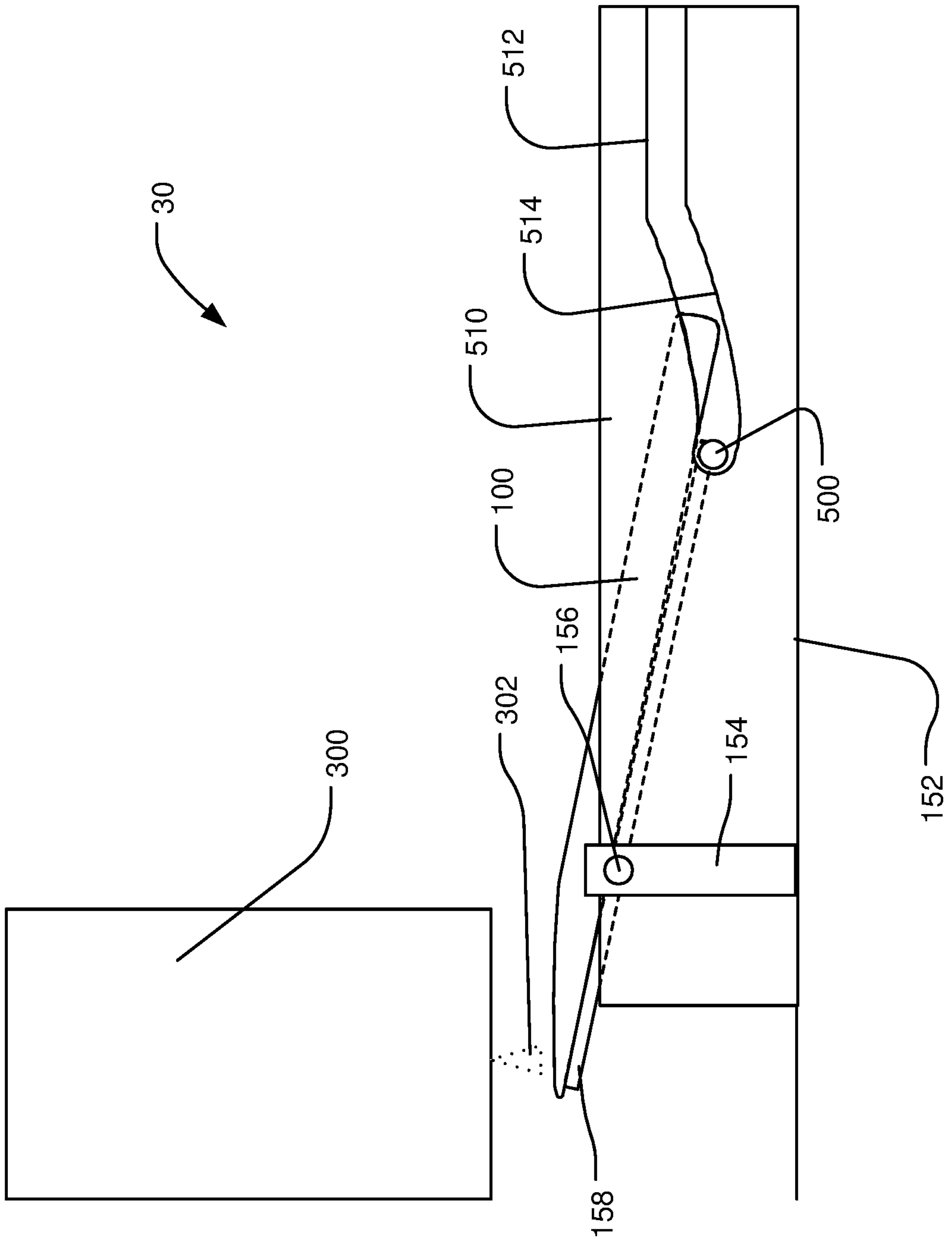
FIG. 8 depicts a side view of an example of a fixture according to the present disclosure positioned relative to a print head and free from engagement with a cam surface to dispose a guitar affixed to the fixture in another position for printing on a different section of the contoured portion of the guitar.

FIG. 8 depicts an alternative example of a fixture 550. The fixture 550 includes a cam follower 500 that is engaged with the bracket 158. In turn, the cam follower 500 may be disposed in a slot 512. The slot 512 may define a cam surface 514 that prescribes movement of the bracket 158 about the axle 156 in response to relative movement between the print head 300 and the article to be printed 100. The slot 512 may be defined in a cam block 510 that is fixed relative to the print head 300. The fixture 550 and cam block 510 may undergo relative movement. Upon relative movement between the fixture 550 and the cam block 510, the cam follower 500 may move within the slot 512 to dispose the bracket 158 at a given rotational position about the axle 156. In this regard, the cam surface 514 of the slot 512 may define a prescribed movement of the article 100 relative to the print head 300 to dispose the article 100 at a given spacing from the print head 300 in a contoured portion 164 and planar portion 166 of the article 100 as described above.

What is claimed is:

1. A fixture for maintaining a uniform spacing between a contoured portion and a planar portion of a surface of an article to be printed and a print head of a printer, comprising:

a bracket to which the article to be printed is secured;

an axle supporting the bracket that defines a pivot axis about which the bracket is rotatable;

a biasing member that biases the bracket into a neutral position in which the planar portion of the surface of the article is at the uniform spacing with the print head of the printer; and a cam surface contactably engageable with the bracket to overcome the biasing member and control pivotal movement of the bracket about the pivot axis, wherein relative movement between the bracket and the cam surface defines a prescribed movement of the bracket about the pivot axis from the neutral position to dispose the contoured portion of the surface of the article at the uniform spacing with the print head of the printer.

2. The fixture of claim 1, further comprising:

a support that extends away from a reference surface of a print bed, the support engaged with and supporting the axle at an offset distance from the reference surface.

3. The fixture of claim 2, wherein the biasing member biases the bracket away from the reference surface by influence of a biasing force applied to the bracket by the biasing member toward the neutral position, and wherein the cam surface acts to overcome the biasing force of the biasing member to pivot the bracket in a direction away from the neutral position toward the reference surface.

4. The fixture of claim 3, wherein the cam surface is stationary with respect to the print head of the printer.

5. The fixture of claim 1, further comprising:

a guitar body comprising the article to be printed, wherein the guitar body includes the contoured portion and the planar portion of the surface.

6. The fixture of claim 5, wherein the guitar body is mounted to the bracket using preexisting holes in the guitar body corresponding to neck mounting holes for the guitar body.

7. The fixture of claim 1, wherein the cam surface is mounted to a support arm mounted to and extending from the print head.

8. The fixture of claim 7, wherein the support arm is moveable relative to the print head to dispose the cam surface between an engaged orientation wherein the cam surface is engaged with respect to the print head and a disengaged orientation wherein the cam surface is disengaged with respect to the print head.

9. The fixture of claim 1, wherein the bracket comprises a cam follower that engages the cam surface.

10. A method for printing an article having a surface comprising a contoured portion and a planar portion, comprising:

supporting the article to be printed on a bracket, the bracket being supported by an axle about which the bracket and article may be pivoted;

biasing the bracket into a neutral position in which the planar portion of the surface is at a uniform spacing with a print head of a printer;

moving at least one of a print head and the article to provide relative movement between the print head and the article;

engaging the bracket with a cam surface; and controlling movement of the bracket and article about the axle in response to the engaging to displace the bracket from the neutral position to dispose the contoured portion of the surface of the article at the uniform spacing with the print head in response to a prescribed movement of the bracket about the axle in response to the engaging.

11. A system for printing an article having a contoured portion and a planar portion of a surface, comprising:

a print head of a printer;

a printer bed disposed at a fixed offset from the print head;

a bracket disposed relative to the printer bed to which the article to be printed is secured;

an axle supporting the bracket that defines a pivot axis about which the bracket is rotatable;

a biasing member that biases the bracket into a neutral position in which the planar portion of the surface of the article is at a uniform spacing with the print head of the printer for printing of the planar portion of the surface of the article by the print head; and a cam surface in fixed relation to a print head and contactably engageable with the bracket overcome the biasing member and to control pivotal movement of the bracket about the pivot axis;

wherein relative movement between the bracket and the cam surface defines a prescribed movement of the bracket about the pivot axis from the neutral position to dispose the contoured portion of the surface of the article in the uniform spacing with the print head for printing of the contoured portion of the surface of the article by the print head.

12. The system of claim 11, further comprising:

a support that extends away from a print bed, the support engaged with and supporting the axle at an offset distance from the print bed.

13. The system of claim 12, wherein the biasing member biases the bracket away from the print bed by influence of a biasing force applied to the bracket by the biasing member, and wherein the cam surface acts to overcome the biasing force of the biasing member to pivot the bracket in a direction away from the neutral position toward the print bed.

14. The system of claim 11, further comprising:

a guitar body comprising the article to be printed, wherein the guitar body comprises the contoured portion and the planar portion of the surface.

15. The system of claim 14, wherein the guitar body is mounted to the bracket using preexisting holes in the guitar body corresponding to neck mounting holes for the guitar body.

16. The system of claim 11, wherein the cam surface is mounted to a support arm mounted to and extending from the print head.

17. The system of claim 16, wherein the support arm is moveable relative to the print head to dispose the cam surface between an engaged orientation wherein the cam surface is engaged with respect to the print head and a disengaged orientation wherein the cam surface is disengaged with respect to the print head.

18. The system of claim 11, wherein the bracket comprises a cam follower that engages the cam surface.

* * * * *